United States Patent
AlAmmouri et al.

(10) Patent No.: US 12,401,408 B2
(45) Date of Patent: Aug. 26, 2025

(54) METHOD AND APPARATUS FOR COMPOSITE BEAM OPERATION AND OVERHEAD REDUCTION

(71) Applicant: Samsung Electronics Co., Ltd., Suwon-si (KR)

(72) Inventors: Ahmad AlAmmouri, Richardson, TX (US); Jianhua Mo, Allen, TX (US); Mustafa Furkan Ozkoc, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 18/365,857

(22) Filed: Aug. 4, 2023

(65) Prior Publication Data

US 2024/0072873 A1     Feb. 29, 2024

Related U.S. Application Data

(60) Provisional application No. 63/400,266, filed on Aug. 23, 2022.

(51) Int. Cl.
H04K 1/10        (2006.01)
H04B 7/06       (2006.01)
(Continued)

(52) U.S. Cl.
CPC ....... H04B 7/06952 (2023.05); H04B 7/0639 (2013.01); H04B 17/327 (2015.01)

(58) Field of Classification Search
CPC .................. H04B 7/06952; H04B 17/327; H04B 7/0639; H04B 7/0695
(Continued)

(56) References Cited

U.S. PATENT DOCUMENTS 10,834,615 B2    11/2020  Raghavan et al.
11,146,321 B2    10/2021  Yoon et al.
(Continued)

FOREIGN PATENT DOCUMENTS

KR   10-2022-0040988 A    3/2022
WO   2015143898 A1        10/2015
(Continued)

OTHER PUBLICATIONS

International Search Report and Written Opinion issued Nov. 13, 2023 regarding International Application No. PCT/KR2023/012279, 7 pages.
(Continued)

*Primary Examiner* — Phuong Phu

(57) ABSTRACT

A method includes identifying child beams of a current composite beam. The method also includes determining an order at which the child beams of the current composite beam are measured based on a likelihood that each child beam of the current composite beam is an optimal beam, among the child beams, to be a serving narrow beam. The method also includes determining a threshold for use in deciding whether to measure one or more additional child beams or select an already measured child beam when selecting the optimal beam. The method also includes selecting the optimal beam, among the child beams, to be the serving narrow beam based on the determined order and the determined threshold.

20 Claims, 11 Drawing Sheets

(51) Int. Cl.
*H04B 17/327* (2015.01)
*H04L 27/28* (2006.01)

(58) Field of Classification Search
USPC ............... 375/260, 267, 299, 347, 219, 220
See application file for complete search history.

(56) References Cited

U.S. PATENT DOCUMENTS

| | | | |
|---|---|---|---|
| 2004/0204114 A1* | 10/2004 | Brennan | ............... H04B 7/0695 455/562.1 |
| 2020/0136708 A1 | 4/2020 | Pan | |
| 2020/0275287 A1 | 8/2020 | Kumagai | |
| 2020/0389800 A1 | 12/2020 | Laghate et al. | |
| 2020/0396749 A1 | 12/2020 | Zhou et al. | |
| 2021/0167821 A1 | 6/2021 | Chen | |
| 2022/0038163 A1 | 2/2022 | Va et al. | |
| 2022/0045727 A1 | 2/2022 | Mehta | |
| 2022/0077977 A1 | 3/2022 | Zhang et al. | |
| 2022/0294513 A1 | 9/2022 | Landstrom et al. | |
| 2022/0368438 A1 | 11/2022 | Yang et al. | |
| 2023/0006714 A1 | 1/2023 | Mo et al. | |
| 2023/0032241 A1 | 2/2023 | Mo et al. | |
| 2023/0075012 A1 | 3/2023 | Laghate et al. | |

FOREIGN PATENT DOCUMENTS

| | | |
|---|---|---|
| WO | 2021096402 A1 | 5/2021 |
| WO | 2023060487 A1 | 4/2023 |

OTHER PUBLICATIONS

Extended European Search Report issued Mar. 25, 2025 regarding Application No. 23857660.7, 10 pages.

* cited by examiner

METHOD AND APPARATUS FOR COMPOSITE BEAM OPERATION AND OVERHEAD REDUCTION

CROSS-REFERENCE TO RELATED APPLICATIONS AND CLAIM OF PRIORITY

The present application claims priority to U.S. Provisional Patent Application Ser. No. 63/400,266 filed on Aug. 23, 2022. The content of the above-identified patent document is incorporated herein by reference.

TECHNICAL FIELD

The present disclosure relates generally to wireless communication systems and, more specifically, the present disclosure relates to a method and apparatus for composite beam operation and overhead reduction.

BACKGROUND

An important part of 5G mmWave communications is beam forming, which is the process in which the transmit energy is narrowly focused into the receiver antenna array, resulting in high channel gains and throughput. However, additional information is needed by the transmitter to decide where to point its transmission such that the receiver is within the beam width of the formed narrow beam. To this end, beam sweeping has been frequently used for successful beamforming and is adopted in the 3GPP NR standard. In this scheme, the transmitter has a set of predefined narrow beams covering the whole desired angular region. The transmitter sends a pilot signal using one narrow beam at a time and asks the receiver to measure the reference signal received power (RSRP) of each beam. Then the receiver feeds back the index of the beam that has the maximum RSRP to the transmitter, and the transmitter uses this beam to transmit data to the receiver.

SUMMARY

The present disclosure relates to wireless communication systems and, more specifically, the present disclosure relates to a method and apparatus for composite beam operation and overhead reduction.

In one embodiment, a method includes identifying child beams of a current composite beam. The method also includes determining an order at which the child beams of the current composite beam are measured based on a likelihood that each child beam of the current composite beam is an optimal beam, among the child beams, to be a serving narrow beam. The method also includes determining a threshold for use in deciding whether to measure one or more additional child beams or select an already measured child beam when selecting the optimal beam. The method also includes selecting the optimal beam, among the child beams, to be the serving narrow beam based on the determined order and the determined threshold.

In another embodiment, a device includes a transceiver and a processor operably connected to the transceiver. The processor is configured to: identify child beams of a current composite beam; determine an order at which the child beams of the current composite beam are measured based on a likelihood that each child beam of the current composite beam is an optimal beam, among the child beams, to be a serving narrow beam; determine a threshold for use in deciding whether to measure one or more additional child beams or select an already measured child beam when selecting the optimal beam; and select the optimal beam, among the child beams, to be the serving narrow beam based on the determined order and the determined threshold.

In yet another embodiment, a non-transitory computer readable medium includes program code that, when executed by a processor of a device, causes the device to: identify child beams of a current composite beam; determine an order at which the child beams of the current composite beam are measured based on a likelihood that each child beam of the current composite beam is an optimal beam, among the child beams, to be a serving narrow beam; determine a threshold for use in deciding whether to measure one or more additional child beams or select an already measured child beam when selecting the optimal beam; and select the optimal beam, among the child beams, to be the serving narrow beam based on the determined order and the determined threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF TRE DRAWINGS

For a more complete understanding of the present disclosure and its advantages, reference is now made to the following description taken in conjunction with the accompanying drawings, in which like reference numerals represent like parts:

DETAILED DESCRIPTION

Figure 1:
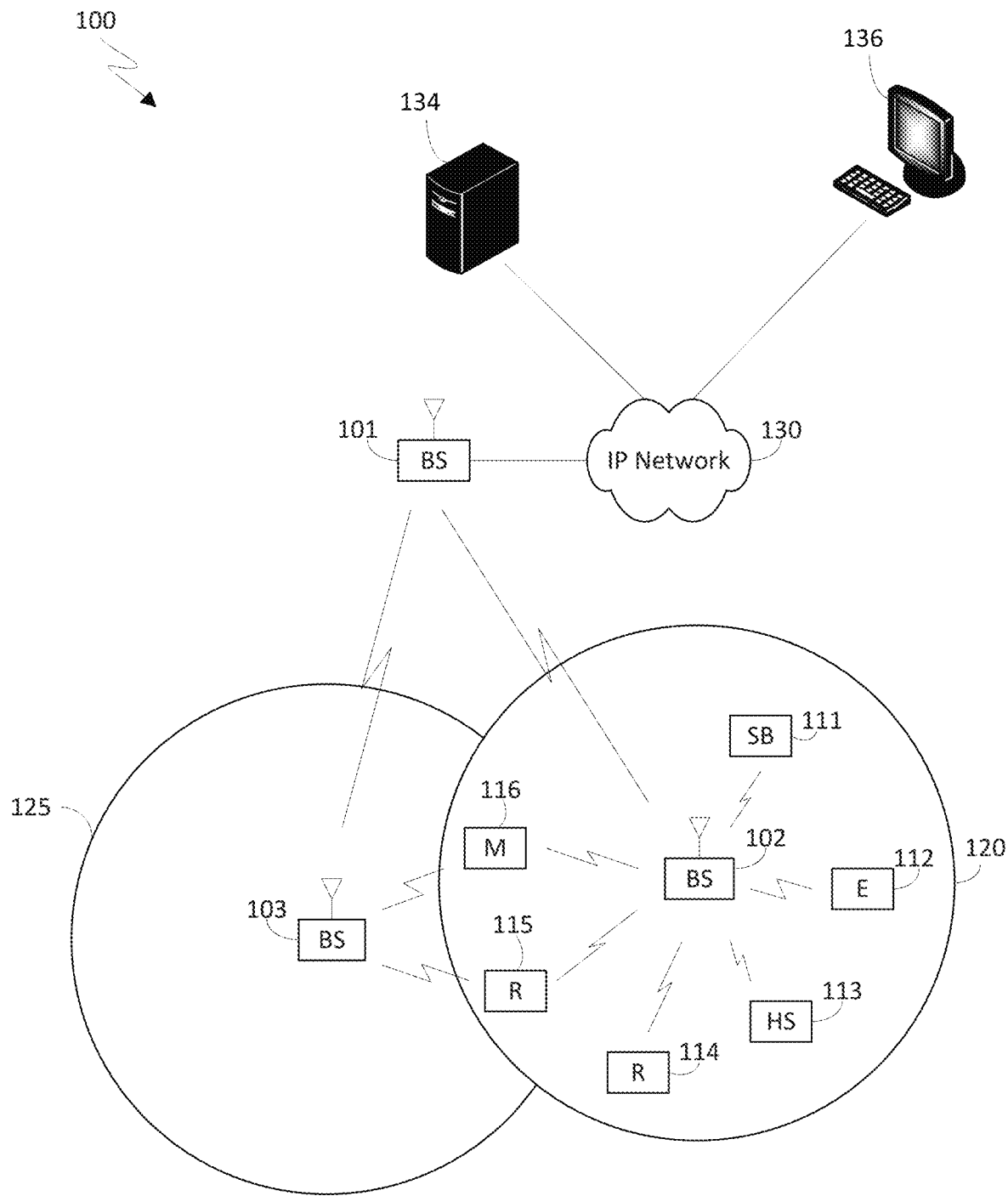
FIG. 1 illustrates an example wireless network according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam foaming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CAP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of communication systems, 6G or even later releases which may use terahertz (THz) bands.

Figure 2:
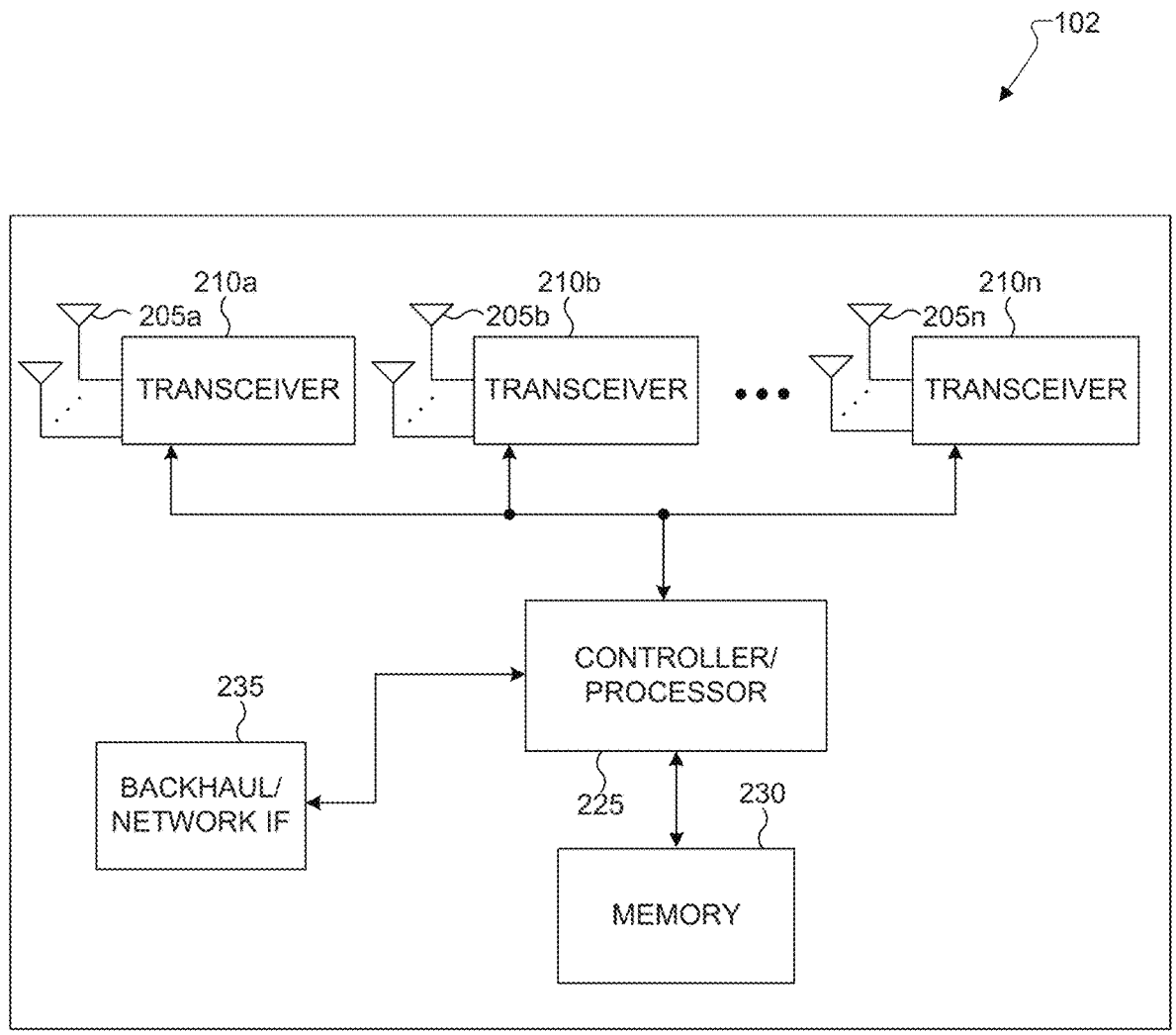
FIG. 2 illustrates an example gNB according to embodiments of the present disclosure.
Figure 3:
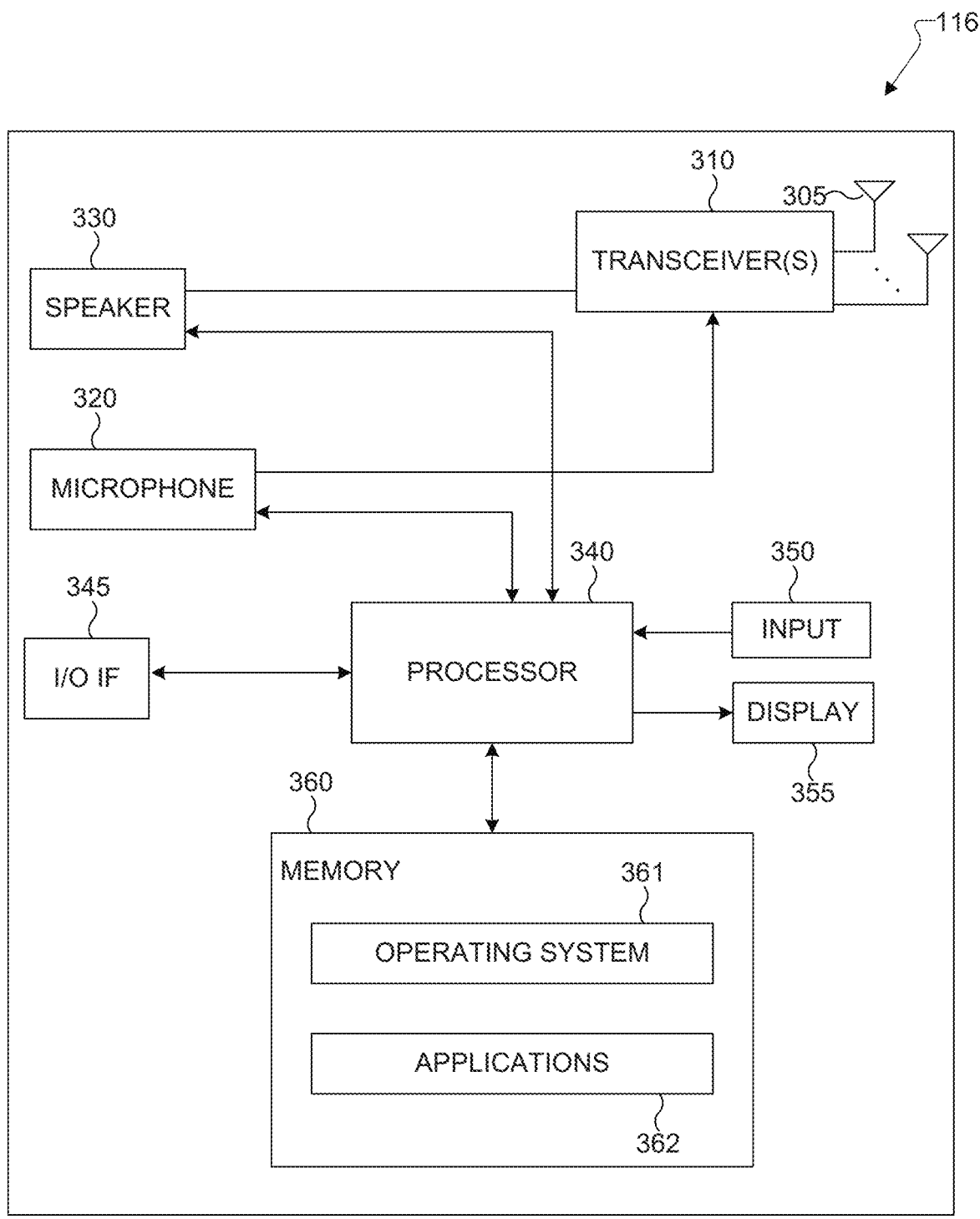
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary; Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

In some embodiments, the network 130 facilitates communications between at least one server 134 and various client devices, such as a client device 136. The server 134 includes any suitable computing or processing device that can provide computing services for one or more client devices. The server 134 could, for example, include one or more processing devices, one or more memories storing instructions and data, and one or more network interfaces facilitating communication over the network 130.

The client device 136 represents any suitable computing or processing device that interacts with at least one server or other computing device(s) over the network 130. In this example, the client device is represented as a desktop computer, but other examples of client devices can include a mobile telephone, laptop computer, or tablet computer. However, an other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device 136 could communicate directly with the network 130 or indirectly with the network 130 via any suitable intermediate device(s) or network(s).

As described in more detail below, a computing device, such as the server 134 or the client device 136, may perform operations in connection with beam management. For example, the server 134 or the client device 136 may perform operations in connection with composite beam operation and overhead reduction as discussed herein.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support composite beam operation and overhead reduction as discussed herein. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE, 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RE signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceivers) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for composite beam operation and overhead reduction. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
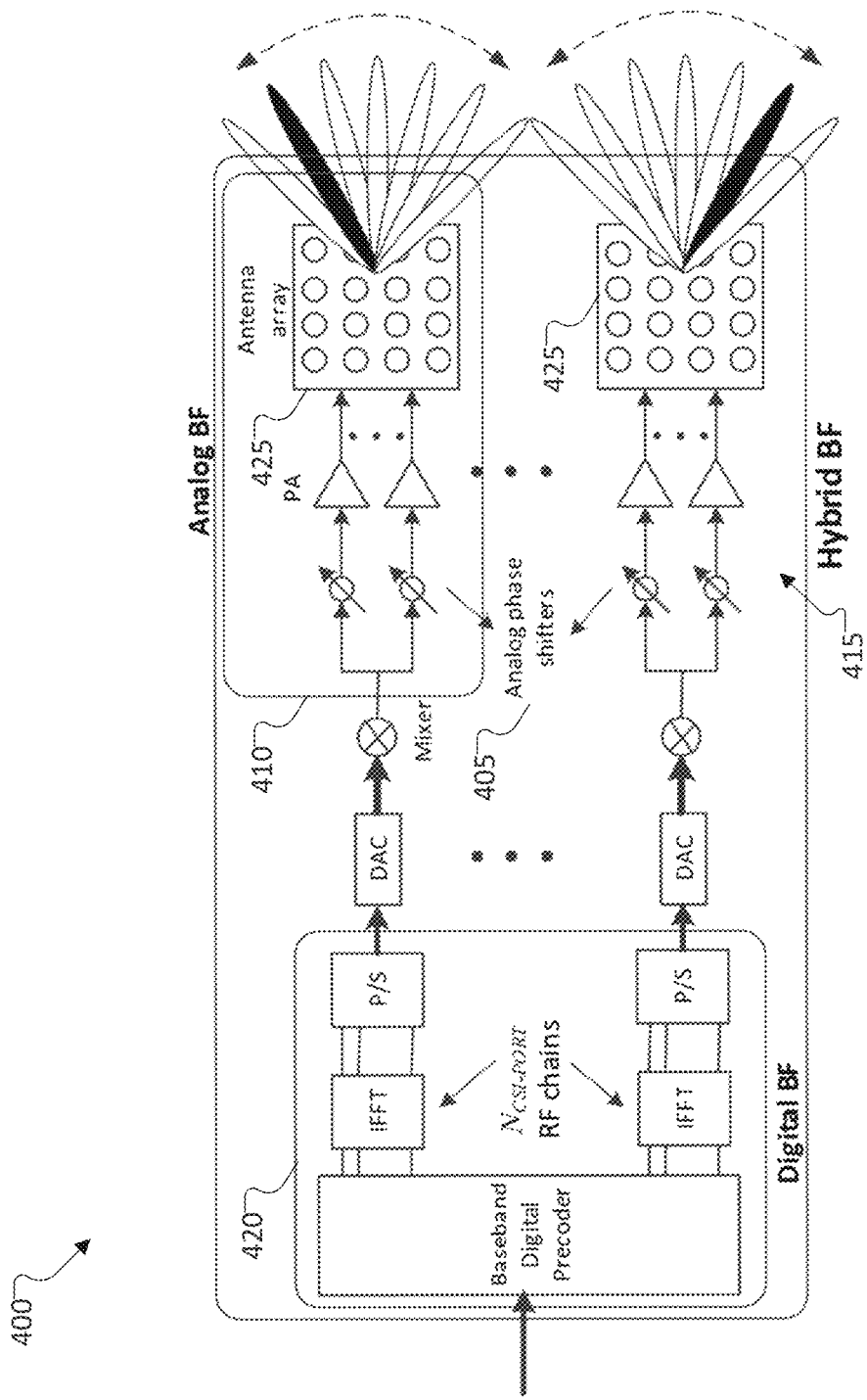
FIG. 4 illustrates an example beamforming architecture according to embodiments of the present disclosure.

FIG. 4 illustrates an example beamforming architecture 400 according to embodiments of the present disclosure. The embodiment of the beamforming architecture 400 illustrated in FIG. 4 is for illustration only. FIG. 4 does not limit the scope of this disclosure to any particular implementation of the beamforming architecture 400. In certain embodiments, one or more of gNB 102 or UE 116 can include the beamforming architecture 400. For example, one or more of antenna 205 and its associated systems or antenna 305 and its associated systems can be configured the same as or similar to the beamforming architecture 400.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 4, the beamforming architecture 400 includes analog phase shifters 405, an analog beamformer (BF) 410, a hybrid BF 415, a digital BF 420, and one or more antenna arrays 425. In this case, one CSI-RS port is mapped onto a large number of antenna elements in antenna arrays 425, which can be controlled by the bank of analog phase shifters 405. One CSI-RS port can then correspond to one sub-array which produces a narrow analog beam through analog beamforming by analog BF 410. The analog beam can be configured to sweep across a wider range of angles by varying the phase shifter bank 405 across symbols or subframes. The number of sub-arrays (equal to the number of RF chains) is the same as the number of CSI-RS ports NCSI-PORT. The digital BF 420 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 400 is also applicable to higher frequency bands such as >52.6 GHz (also termed the FR4), In this case, the beamforming architecture 400 can employ only analog beams. Due to the O2 absorption loss around 60 GHz frequency (~10 decibels (dB) additional loss @100 m distance), larger numbers of and sharper analog beams (hence larger number of radiators in the array) will be needed to compensate for the additional path loss.

As discussed above, an important part of 5G mmWave communications is beamforming, which is the process in which the transmit energy is narrowly focused into the receiver antenna array, resulting in high channel gains and throughput. However, additional information is needed by the transmitter to decide where to point its transmission such that the receiver is within the beam width of the formed narrow beam. To this end, beam sweeping has been frequently used for successful beamforming and is adopted in the 3GPP NR standard. In this scheme, the transmitter has a set of predefined narrow beams covering the whole desired angular region. The transmitter sends a pilot signal using one narrow beam at a time and asks the receiver to measure the reference signal received power (RSRP) of each beam. Then the receiver feeds back the index of the beam that has the maximum RSRP to the transmitter, and the transmitter uses this beam to transmit data to the receiver.

Figure 5:
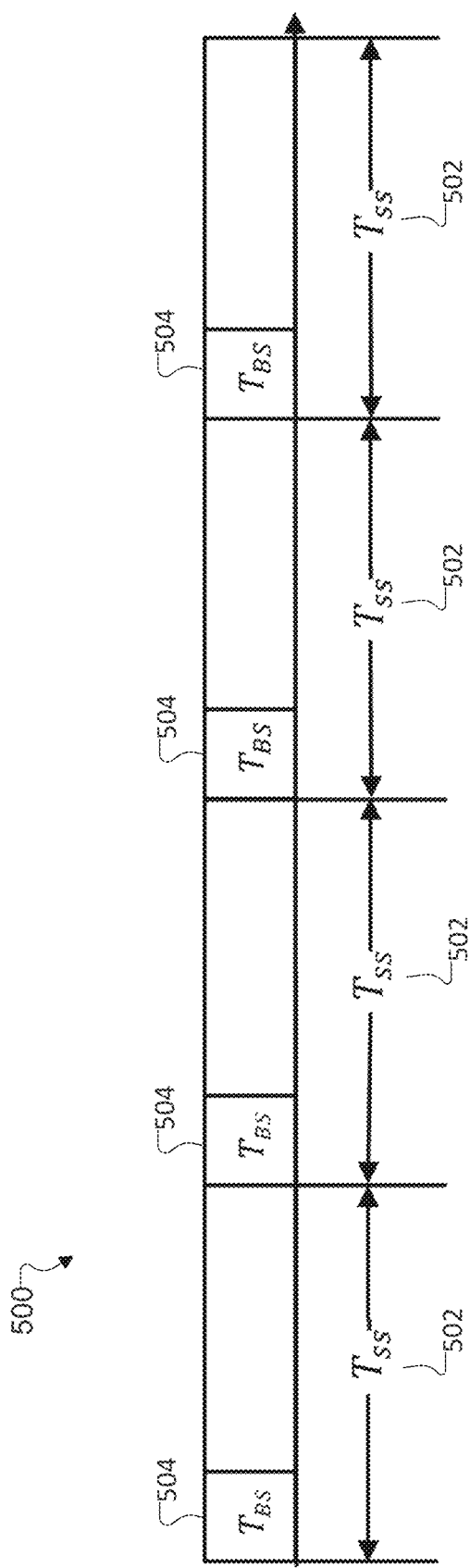
FIG. 5 illustrates a timeline showing periodic beam sweeping in 5G NR.

However, the best beam to use is determined by the time-varying channel between transmitter and receiver. Hence, the beam sweeping process has to be repeated every now and then to make sure that the transmitter is using the best beam to send data to the receiver. For example, in the 3GPP 5G NR standard, this process is done every SSB period, denoted hereafter by $T_{SS}$, which can be set to 20 ms. Every $T_{SS}$ the BS has to determine which beam to use through beam sweeping, then use it to transmit data during the remaining time of $T_{SS}$. Hence, the overhead of beam sweeping is observed every $T_{SS}$. Ideally, this overhead is minimized while maintaining reasonably fresh measurements of the channel. Hereafter, the time used to perform beam sweeping is referred to by $T_{BS}$. FIG. 5 illustrates a timeline 500 showing periodic, beam sweeping in 5G NR. As shown in FIG. 5, every SSB period 502 includes a beam sweeping period 504.

Assuming that the BS has a set of narrow beams with a size of N, then it is clear from the discussion so far that the BS has to measure N beams to determine which beam to use every $T_{SS}$. To reduce this overhead, an improved scheme, denoted as composite beam (CB) beamforming, has been used. In this scheme, a composite beam is formed by combining two narrow beams, resulting in a total of N/2 composite beams. Then the BS transmits a pilot signal on each of the composite beams to determine which composite beam is optimal to use. After which, the BS transmits a pilot signal on each of the narrow beams forming the optimal composite beam and asks the UE to report the measured RSRP of these two beams. The BS then selects the narrow beam with the highest RSRP as the serving beam. Hence, the BS needs to only measure $$\frac{N}{2}+2$$

beams. The $$\frac{N}{2}$$

NBs are measured through MAC-CE signaling, and the remaining two NBs are measured through CSI-RS signaling.

Forming the CBs can be achieved through separating the antenna array into two separate subarrays, each having a set of NBs. Then a NB from the first subarray is paired with a NB from the second subarray forming a CB. Then after finding the best NB, only a single subarray is used to beam form towards the desired user. In this case, each subarray could be used to serve a certain user. However, the CBs can be formed utilizing the whole array, where a set of NBs are designed for the whole array, then each two NBs are paired to form a CB. In this case, the whole array is used to beamform towards the desired user, and the BS can focus the energy in a single direction at any given time.

It is noted that a composite beam system can also be implemented with three (or more) narrow beams for a single SSB index. The term "narrow beam" is used here since a large antenna array, which is a typical setup for 5G mmWave network deployment, is capable of forming narrow beams.

The problem in the baseline approach is the need to measure two NBs (or more if more NBs are used to form each CB) beams every $T_{SS}$ through CSI-RS signaling. This reduces the time available to the BS to transmit data to the UE. Also, higher overheads increase the latency, which is critical in 5G communications.

To address these and other issues, this disclosure provides systems and methods for composite beam operation and overhead reduction. The disclosed embodiments reduce the beam measurement overhead by reducing the number of beams the BS has to measure. This is achieved by the BS using one or more novel procedures to determine how many child beams it needs to measure before determining the serving beam. The procedures focus on carefully choosing the order in which the narrow beams are measured and calculating a threshold to determine when to stop measuring the narrow beams' RSRP and choose the best out of the ones already measured. As a result, the disclosed embodiments provide multiple important properties, including increasing the data throughput and reducing the latency experienced by the UE.

Some of the embodiments discussed below are described in the context of mmWave bands. Of course, these are merely examples. It will be understood that the principles of this disclosure may be implemented in any number of other composite beam systems with any beam-width. Also, it is noted that despite a focus on the RSRP in the description below, the UE measurements of the channel could be reference signal received quality (RSRQ), channel quality indicator (CQI), signal-to-noise-ratio (SNR), signal-to-interference-noise-ratio (SINR), and the like. The embodiments in this disclosure can be applied to those measurement metrics as well.

Figure 6:
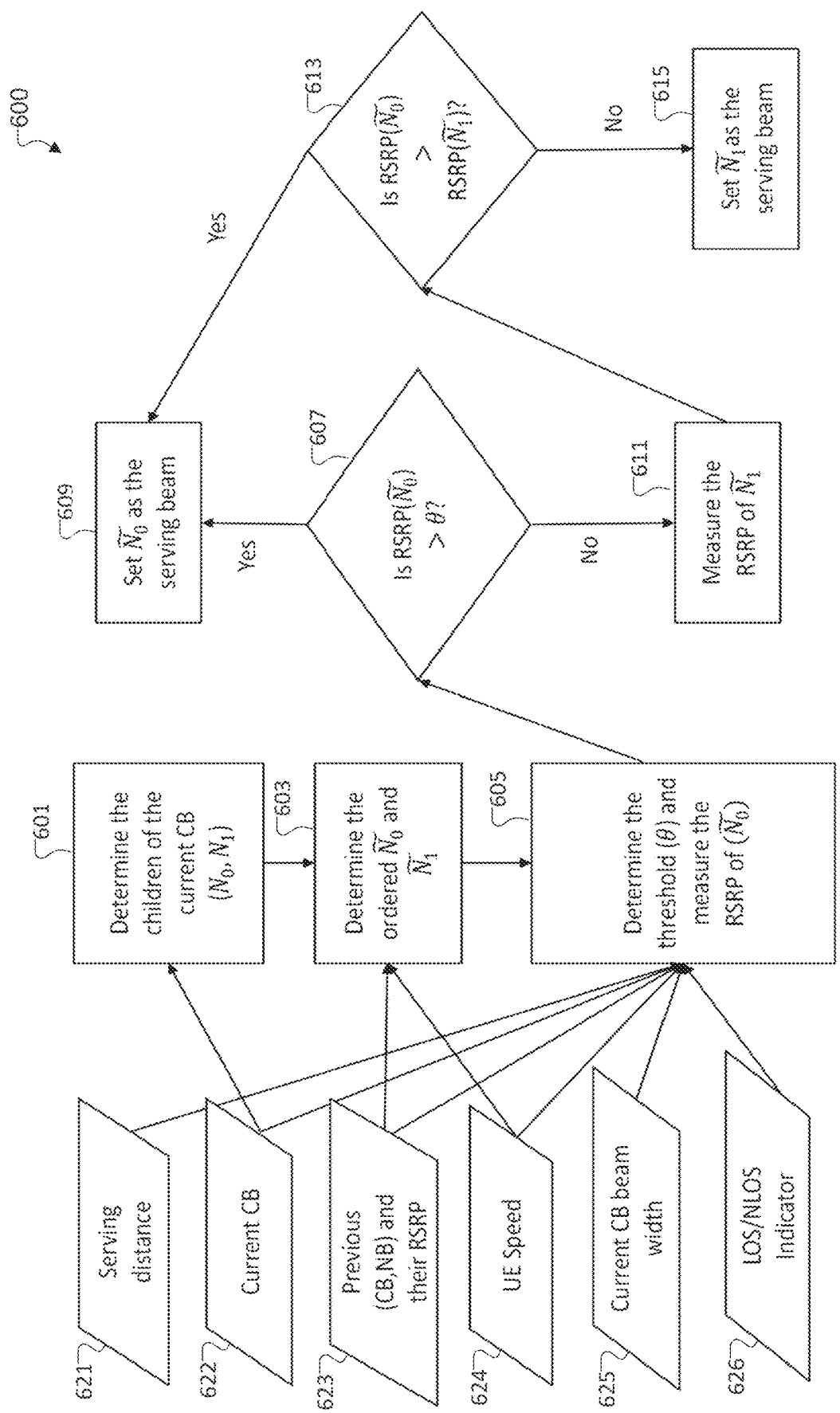
FIG. 6 illustrates an example process for composite beam operation and overhead reduction according to embodiments of the present disclosure.

FIG. 6 illustrates an example process 600 for composite beam operation and overhead reduction according to embodiments of the present disclosure. For ease of explanation, the process 600 will be described as performed by the BS 102 of FIG. 1; however, the process 600 could be performed by any other suitable device or system. The embodiment of the process 600 shown in FIG. 6 is for illustration only. Other embodiments of the process 600 could be used without departing from the scope of this disclosure.

Using the process 600, the BS 102 can choose the order at which the child beams of the current best composite beam are measured. Broadly speaking, the main idea is to properly order the narrow beams of the current best CB before measuring them and only measure the first one as a reference point. Then only measure the second beam if the RSRP of the first one is low and there is a potential gain from measuring the second beam. The order takes into account the previously used NBs and CBs and is based on the likelihood that each child narrow beam of the current CB is the best beam. An example of determining the likelihood is based on the distance between the previous NB and each child of the current CB. Smaller distance increases the chance that the NB will be searched first. The BS 102 can also adaptively determine the threshold used by the BS 102 to determine whether to search more child beams or choose the best out the ones already measured. If the RSRP of the child beam is higher than the threshold, then the BS 102 will stop measuring the rest of the beams and make the beam with the highest RSRP the serving beam.

As shown in FIG. 6, the process 600 includes operation 601, in which the BS 102 determines the child NBs of the current CB 622. In this example, there are two child NBs, which are denoted as $N_0$ and $N_1$.

At operation 603, the BS 102 determines an order for the child NBs $N_0$ and $N_1$ of the current CB 622. In one option, the BS 102 orders the child NBs based on the likelihood that they are the best NB. That is, the determined order can be an order from mostly likely to be the best beam to least likely to be the best beam. The likelihood could be computed based on the angular distance between the child NBs and the previous NB. For example, if the previous NB points to the direction $(\theta_0, \phi_0)$ and the child NBs of the best CB point to the directions $(\theta_1, \phi_1), (\theta_2, \phi_2), \ldots, (\theta_N, \phi_N)$, then the angular distance between $(\theta_0, \phi_0)$ and $(\theta_i, \phi_i)$ could be computed as:

$$d_i = \arccos([\sin \theta_0 \cos \phi_0, \sin \theta_0 \sin \phi_0, \cos \theta_0][\sin \theta_i \cos \phi_i, \sin \theta_i \sin \phi_i, \cos \theta_i]^T).$$

The child NB with the smaller $d_i$ is searched first. The child beam with the larger $d_i$ is searched later. Hereafter, the closest beam is considered the first beam and is denoted as $\widetilde{N_1}$ and the other one is considered the second beam and is denoted as $\widetilde{N_0}$. The pointing angles of each NB could be stored in the BS 102 and retrieved via a simple lookup table.

In another option, the BS 102 could adopt spatial distance to order the child NBs. For example, the BS 102 first identifies the coverage region of each NB over the ground, and then determines the distance between the previous NB and child NBs based on their coverage regions. As a particular example, the spatial distance could be the distance between the centers of two coverage regions. The first child NB should be searched first since it is more likely to be the best next NB.

In yet another option, the BS 102 could take into account the UE movement speed 624 and movement direction when determining the order to search the child NBs. For example, a UE with a high speed (e.g., a car on the highway or a high-speed train) could traverse a long distance in a short time between CB measurements. Therefore, the closet NB may not be the best child NB. However, in this option, the BS 102 can take care of the UE movement speed while determining the threshold θ.

In still another option, the BS 102 could consider the typical UE mobility pattern when determining the order to search the child NBs. A UE mobility pattern can be defined by a sequence or group of best NB indices for the UE over a time duration. It can also be defined by the geographical location change of the UE over a time duration. For example, assume that a UE is moving along a road, street, or sidewalk. By examining the road/street/sidewalk in the cell, it can be determined how the NB changes as the UE moves along the road/street/sidewalk. In one approach, a UE can be dropped at all possible locations within the cell, and then the UE is permitted to perform one or more random walks within the cell. During the walk, the best NB sequence of the UEs is noted. For example, one such sequence could be [NB1, NB2, NB2, NB5, NB5, NB5, NB2, . . . ]. From these sequences, the mobility pattern of the UE can be determined.

Figure 7:
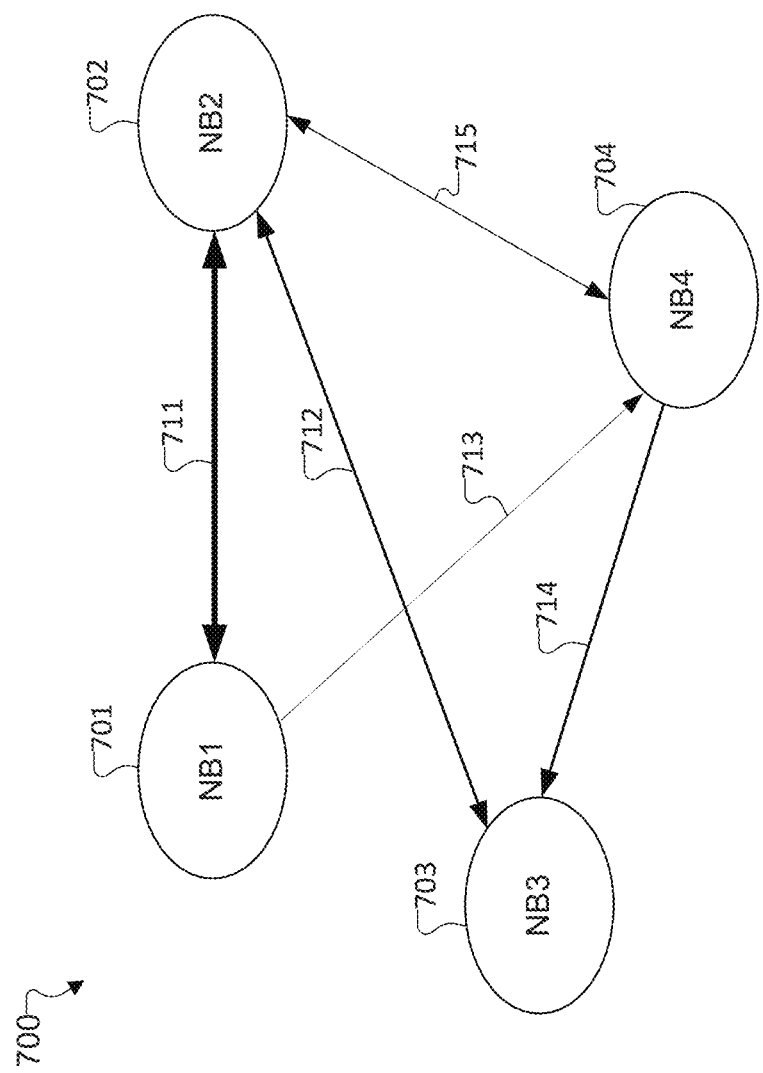
FIG. 7 illustrates an example state diagram modeling a UE mobility pattern based on UE report hi story according to embodiments of the present disclosure.

According to one technique, the BS 102 could model the mobility pattern as a Markov chain. That is, given the UE is served by NB-X now, what is the probability that the UE will be served by a beam in the next time step, FIG. 7 illustrates an example state diagram 700 modeling the UE mobility pattern based on UE report history according to embodiments of the present disclosure. As shown in FIG. 7, the state diagram 700 includes multiple beams 701-704 (identified as NB1 through NB4). The state diagram 700 shows example results of dominant mobility pattern obtained from the analysis. If the UE moves from the coverage region of a first beam 701-704 to a second beam 701-704 with relatively high chance, there is an arrow 711-715 pointing from the first beam 701-704 to the second beam 701-704. Most of the arrows 711-715 are likely to be two-way, but one-way arrows (e.g., arrow 713) are also possible, such as along a one-way road. The thickness of the arrows 711-715 in FIG. 7 can represent the occurrence chance of the transition. The narrow beams 701-704 with high transition probabilities could be assigned to a same parent wide beam, while the narrow beams 701-704 with zero or low transition probabilities could be assigned to different wide beams. In FIG. 7, there is no arrow between the beams 701 and 703, and a thick arrow 711 between the beams 701 and 702. Therefore, the BS 102 could choose to design a hierarchical codebook where the beams 701 and 702 belong to the same parent, and the beams 703 and 704 belong to another parent.

According to another technique, the BS 102 could learn the mobility pattern by training a recurrent neural network (RNN), for example, a LSTM (Long Short-Term Memory) network. Given the history records of the NB, the RNN models predict the probability of the next best NB.

Turning again to FIG. 6, at operation 605, the BS 102 determines a threshold θ and measures the RSRP of the first beam $\widetilde{N_1}$. The threshold θ, under which an RSRP is considered low, is determined by additional information known by the BS 102 about the connected UEs and their environment. The BS 102 uses the threshold θ to determine whether or not to measure the second beam $\widetilde{N_0}$.

A significant issue for the BS 102 is determining the value of θ. If θ is set to a very high value, then both beams $\widetilde{N_0}$ and $\widetilde{N_1}$ are measured, which has the potential to track the best beam better at the expense of higher overhead. If θ is set to a very low value, then the BS 102 only measures one beam each time, which is set as the serving beam. This reduces the overhead, but at the expense of a higher probability of not selecting the best beam. Furthermore, a fixed θ does not ensure an optimal performance for all users. Some users might benefit from a large θ, while others might benefit from a low θ.

Apart from the two trivial cases just mentioned (very high and very low values of θ), the objective of the BS 102 is to dynamically calculate the threshold θ based on some or all of the information available at the BS 102. For example, the BS 102 can determine the threshold θ using any one or more of the following: the serving distance 621 between the BS 102 and the UE, the current CB 622, the previous NB and CB 623 used to serve the UE and their measured RSRP, the UE speed 624, the beam width 625 of the current best CB, and the LOS/NLOS status 626 of the UE's link. This can be represented as a function given by:

θ=F( . . . ), where F( . . . ) is a predetermined function that takes into account one or more of {the serving distance 621, the current CB 622, the previous NB and CB 623 and their measured RSRP, the UE speed 624, the beam width 625, and the LOS/NLOS status 626} to determine the current threshold. The effect of some of these parameters on the threshold θ is as follows:

Serving distance 621: The larger the serving distance between the BS 102 and the UE the lower the chance that the UE has moved outside the realm of its previous narrow beam, which means that the chance that the closest NB is the best beam is higher. Hence, the larger the serving distance, the lower the threshold θ.

Current CB 622: The higher the RSRP of the current CB, the higher the threshold θ.

Previous NB 623: The higher the RSRP of the previous NB, the higher the threshold θ.

UE speed 624: The higher the UE speed, the higher the chance that the closest NB is not the best beam. Hence, the threshold θ is expected to be higher for high UE speeds.

Beam width 625: The larger the beam width of the current CB, the higher the chance that the closest NB is in fact the best NB, since the other beam is reasonably far from the previous NB. Hence, the higher the beam width, the lower the threshold θ.

LOS/NLOS status 626: If the UE's link switches from LOS to NLOS or from NLOS to LOS, then there is a high chance that the closest beam is not the optimal one, since this transition can lead to a big change in the angle-of-arrival. Hence, a transition like this yields a high value of the threshold θ. If the UE's link was LOS and is still LOS, then it is highly likely that the closest beam is the optimal beam since it means that no significant changes in the environment happen, and hence, the threshold θ is expected to be low. If the UE's link was NLOS and is still NLOS, then there is no guarantee that a major change happened in the environment and no guarantee that the environment remained the same. In such a case, there may not be enough information to increase or decrease the threshold θ, so the threshold θ can be kept the same as in the previous time slot.

UE receiving beam: If the BS detects a change in the UE receiving beam, then the closest beam has a lower probability of being the optimal beam. Hence, searching all the child beams can be beneficial in this case, i.e., a high threshold θ can be used.

The most generic form of F( . . . ) is given next.

$$F = \begin{cases} \alpha_1 RSRP(NB^{t-1})RSRP(CB^t)UE\ Speed * \frac{1}{\text{Beam Width}} \frac{1}{\text{Serving Dist}}, & LOS \to NLOS\ \text{or}\ NLOS \to LOS \\ \alpha_2 RSRP(NB^{t-1})RSRP(CB^t)UE\ Speed * \frac{1}{\text{Beam Width}} \frac{1}{\text{Serving Dist}}, & NLOS \\ \alpha_3 RSRP(NB^{t-1})RSRP(CB^t)UE\ Speed * \frac{1}{\text{Beam Width}} \frac{1}{\text{Serving Dist}}, & LOS \end{cases}$$

where RSRP($NB^{t-1}$) is the RSRP of the previous NB 623, RSRP($CB^t$) is the RSRP of the current CB 622, and $\alpha_1 \gg \alpha_2 > \alpha_3$ are parameters set by the operator, and could be universally set for all BSs, or could be site-specific and learned for every BS separately. The parameter $\alpha_1$ could be set to ∞ to force a fully beam search every time a transition from LOS to NLOS or from NLOS to LOS is detected. The parameter $\alpha_3$ could be set to 0 such that only the closest beam is searched when the UE is in LOS. Another option is that these values are fixed when each BS is installed, then adapted to account for each BS's environment.

Another option is to include an indicator for a change in the UE receiving beam, which if triggered, a full search is performed. Other simpler forms of F( . . . ) are also possible depending on the information available to the BS 102.

Once the BS 102 determines the threshold θ and measures the RSRP of the first beam $\widetilde{N_1}$ at operation 605, then at operation 607, the BS 102 determines if the RSRP of the first beam $\widetilde{N_1}$ is greater than the threshold θ. If the RSRP of the first beam $\widetilde{N_1}$ is greater than the threshold θ, then at operation 609, the BS 102 sets the first beam $\widetilde{N_1}$ as the serving beam. Alternatively, if the RSRP of the first beam $\widetilde{N_1}$ is not greater than the threshold θ, then at operation 611, the BS 102 measures the RSRP of the second beam $\widetilde{N_0}$. Then, at operation 613, the BS 102 determines if the RSRP of the first beam $\widetilde{N_1}$ is greater than the RSRP of the second beam $\widetilde{N_0}$. If so, then at operation 609, the BS 102 sets the first beam $\widetilde{N_1}$ as the serving beam. If not, then at operation 615, the BS 102 sets the second beam $\widetilde{N_0}$ as the serving beam.

Figure 8:
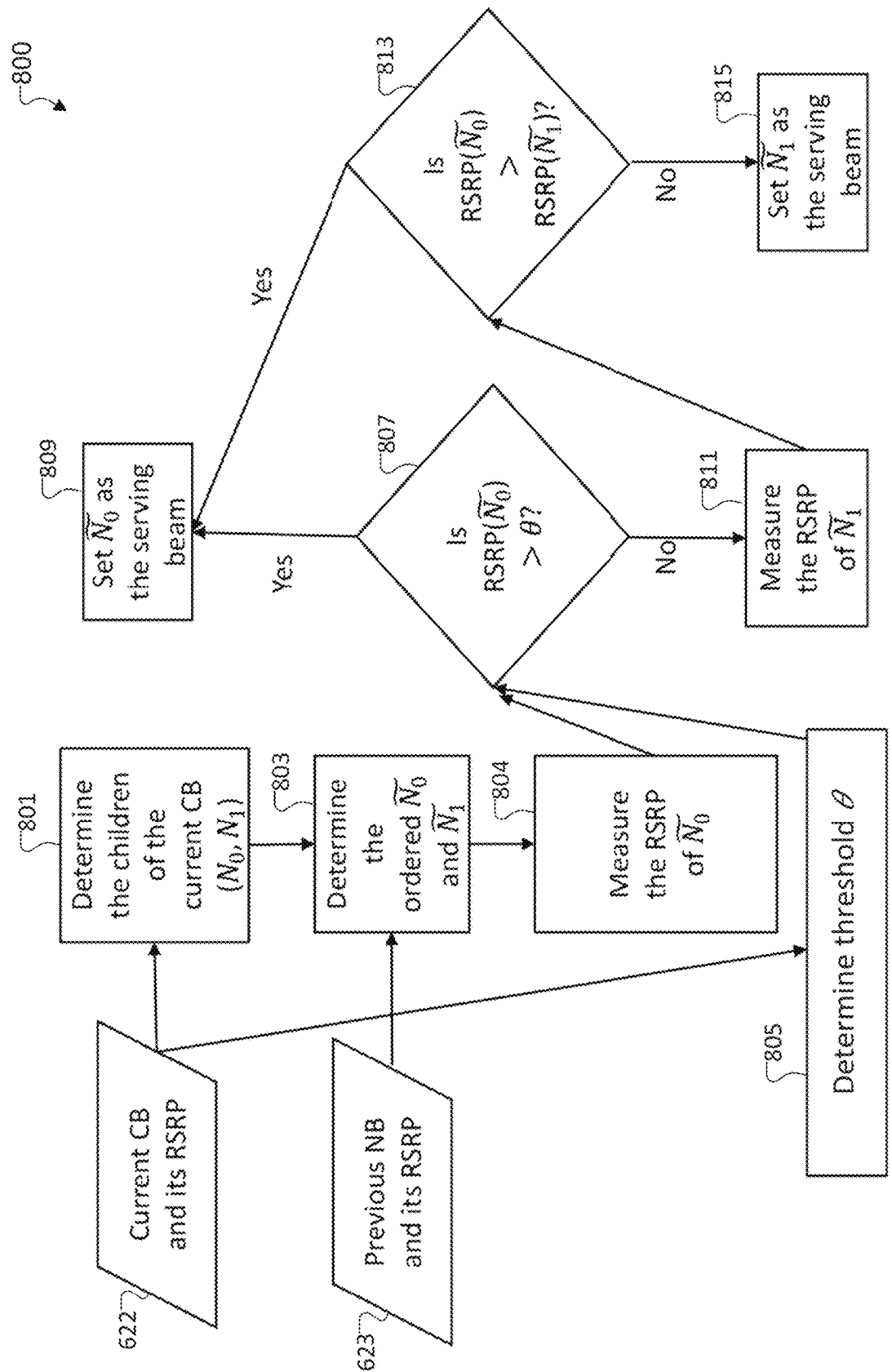
FIGS. 8 through 10 illustrate other example processes for composite beam operation and overhead reduction according to embodiments of the present disclosure.

FIG. 8 illustrates another example process 800 for composite beam operation and overhead reduction according to embodiments of the present disclosure. For ease of explanation, the process 800 will be described as performed by the BS 102 of FIG. 1; however, the process 800 could be performed by any other suitable device or system. The embodiment of the process 800 shown in FIG. 8 is for illustration only. Other embodiments of the process 800 could be used without departing from the scope of this disclosure.

The process 800 can be useful in implementations where the BS 102 has limited information about the UE, such as its speed, serving distance, and the like. Hence, the process 800 differs from the process 600 in that the process 800 only relies on the BS CB codebook and the available RSRP measurements. In other words, all the inputs needed to find the beam ordering and thresholding are based on the RSRP measurements and properties of the beam codebook itself; additional information about the served UEs is not required.

As shown in FIG. 8, some of the operations of the process 800 are the same as, or similar to, corresponding operations in the process 600. However, the procedure to determine the threshold θ is different in the process 800 as compared to the process 600.

At operation 801, the BS 102 determines the child NBs of the current CB 622. In this example, there are two child NBs, which are denoted as $N_0$ and $N_1$. At operation 803, the BS 102 determines an order for the child NBs $N_0$ and $N_1$, and denotes the first beam as $\widetilde{N_1}$ and denotes the second beam as $\widetilde{N_0}$. The ordering of the child NBs in operation 803 can be based on the distance between the NBs, such as in operation 603. At operation 804, the BS 102 measures the RSRP of the first beam $\widetilde{N_1}$.

At operation 805, the BS 102 determines the threshold θ. The threshold θ is determined based on the RSRP of the current CB 622. In other words, when the best CB is determined, the threshold θ is found based on the RSRP of that CB, such as by the following:

$$\theta = RSRP(CB) - \tilde{\theta},$$

where the RSRP value is in dB scale, and $\tilde{\theta}$ is a tunable parameter. Hence, if the RSRP of the current NB is high, the threshold is set to a high value. An example value of $\tilde{\theta}$ is 3 dB. This value is based on the observation that if the CB is formed as the sum of two NBs, the best NB should have an RSRP at least half of the RSRP of the CB. Similar reasoning can be applied to the case of >2 NBs per CB. However, this option works best when each NB is formed from a separate subarray, i.e., the RSRP of a CB is equal to the sum of its child NBs, meaning than the CB has an RSRP at least as good as the best NB. This reasoning is not valid for the case of a single array case, since the CB RSRP could be smaller than the NB RSRP of the best NB, i.e., all the energy is focused in a narrower region.

Once the BS 102 measures the RSRP of the first beam $\widetilde{N_1}$ at operation 804 and determines the threshold θ at operation 805, then at operation 807, the BS 102 determines if the RSRP of the first beam $\widetilde{N_1}$ is greater than the threshold θ. If the RSRP of the first beam $\widetilde{N_1}$ is greater than the threshold θ, then at operation 809, the BS 102 sets the first beam $\widetilde{N_1}$ as the serving beam. Alternatively, if the RSRP of the first beam $\widetilde{N_1}$ is not greater than the threshold θ, then at operation 811, the BS 102 measures the RSRP of the second beam $\widetilde{N_0}$. Then, at operation 813, the BS 102 determines if the RSRP of the first beam $\widetilde{N_1}$ is greater than the RSRP of the second beam $\widetilde{N_0}$. If so, then at operation 809, the BS 102 sets the first beam $\widetilde{N_1}$ as the serving beam. If not, then at operation 815, the BS 102 sets the second beam $\widetilde{N_0}$ as the serving beam.

Figure 9:
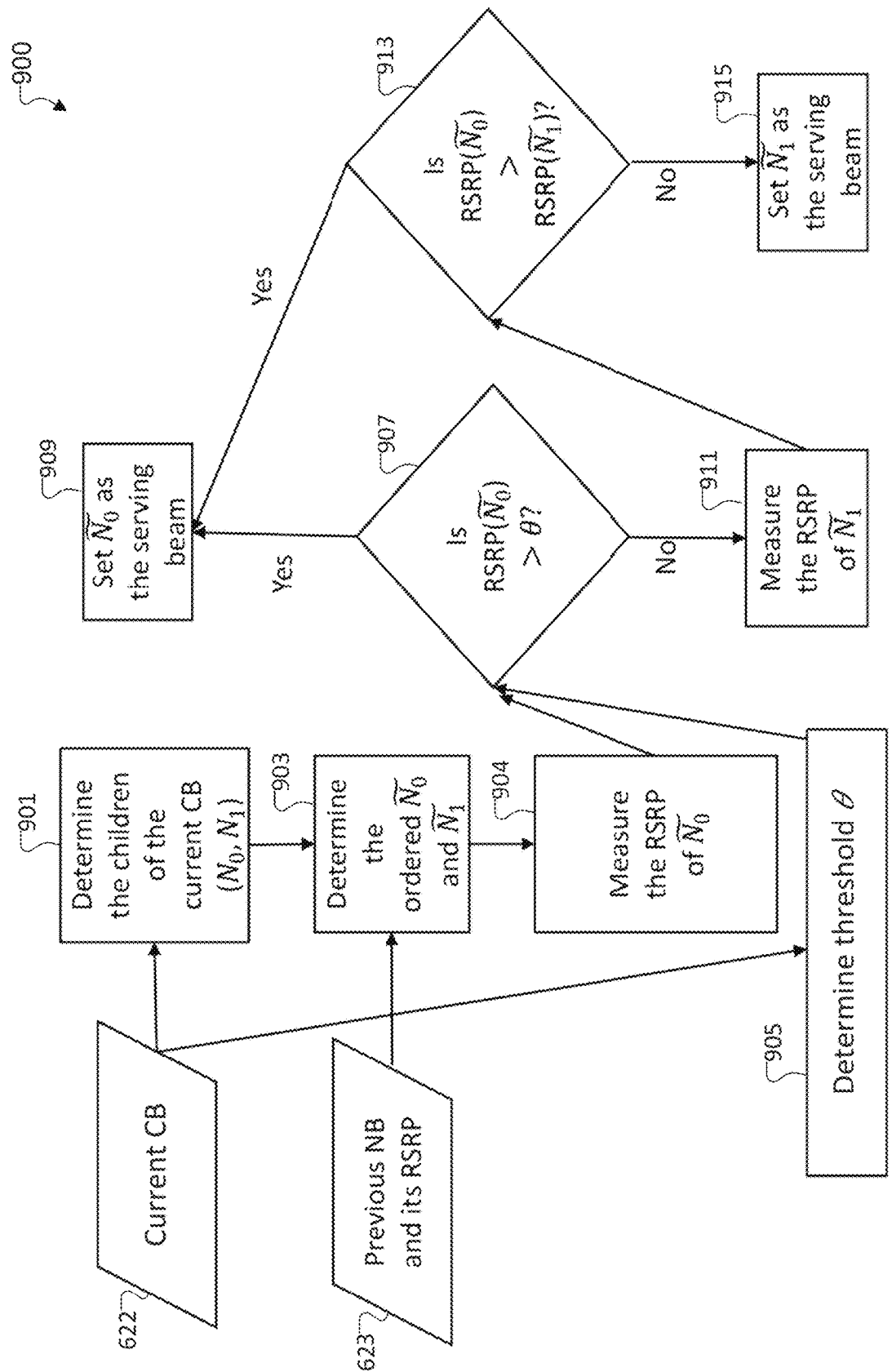

FIG. 9 illustrates another example process 900 for composite beam operation and overhead reduction according to embodiments of the present disclosure. For ease of explanation, the process 900 will be described as performed by the BS 102 of FIG. 1; however, the process 900 could be performed by any other suitable device or system. The embodiment of the process 900 shown in FIG. 9 is for illustration only. Other embodiments of the process 900 could be used without departing from the scope of this disclosure.

Like the process 800, the process 900 can be useful in implementations where the BS 102 has limited information about the UE, such as its speed, serving distance, and the like. Hence, the process 900 differs from the process 600 in that the process 900 only relies on the BS CB codebook and the available RSRP measurements. In other words, all the inputs needed to find the beam ordering and thresholding are based on the RSRP measurements and properties of the beam codebook itself; additional information about the served UEs is not required.

As shown in FIG. 9, some of the operations of the process 900 are the same as, or similar to, corresponding operations in the process 800. However, the procedure to determine the threshold θ is different in the process 900 as compared to the process 800.

At operation 901, the BS 102 determines the child NBs of the current CB 622. In this example, there are two child NBs, which are denoted as $N_0$ and $N_1$. At operation 903, the BS 102 determines an order for the child NBs $N_0$ and $N_1$, and denotes the first beam as $\widetilde{N_1}$ and denotes the second beam as $\widetilde{N_0}$. The ordering of the child NBs in operation 903 can be based on the distance between the NBs, such as in operation 603. At operation 904, the BS 102 measures the RSRP of the first beam $\widetilde{N_1}$.

At operation 905, the BS 102 determines the threshold θ. Different from the process 800, in operation 905, only the beam width of the current CB and the RSRP of the previous NB are used in determining the threshold θ:

$$\theta = RSRP(NB^{t-1}) + \frac{\alpha_4}{\text{Beam Width}}$$

where $\alpha_4$ is a design parameter that can be predetermined as discussed above for $\alpha_1$, $\alpha_2$, $\alpha_3$. This option works for the single array case as well as the subarrays case discussed above.

Once the BS 102 measures the RSRP of the first beam $\widetilde{N_1}$ at operation 904 and determines the threshold θ at operation 905, then at operation 907, the BS 102 determines if the RSRP of the first beam $\widetilde{N_1}$ is greater than the threshold θ. If the RSRP of the first beam $\widetilde{N_1}$ is greater than the threshold θ, then at operation 909, the BS 102 sets the first beam $\widetilde{N_1}$ as the serving beam. Alternatively, if the RSRP of the first beam $\widetilde{N_1}$ is not greater than the threshold θ, then at operation 911, the BS 102 measures the RSRP of the second beam $\widetilde{N_0}$. Then, at operation 913, the BS 102 determines if the RSRP of the first beam $\widetilde{N_1}$ is greater than the RSRP of the second beam $\widetilde{N_0}$. If so, then at operation 909, the BS 102 sets the first beam $\widetilde{N_1}$ as the serving beam. If not, then at operation 915, the BS 102 sets the second beam $\widetilde{N_0}$ as the serving beam.

Figure 10:
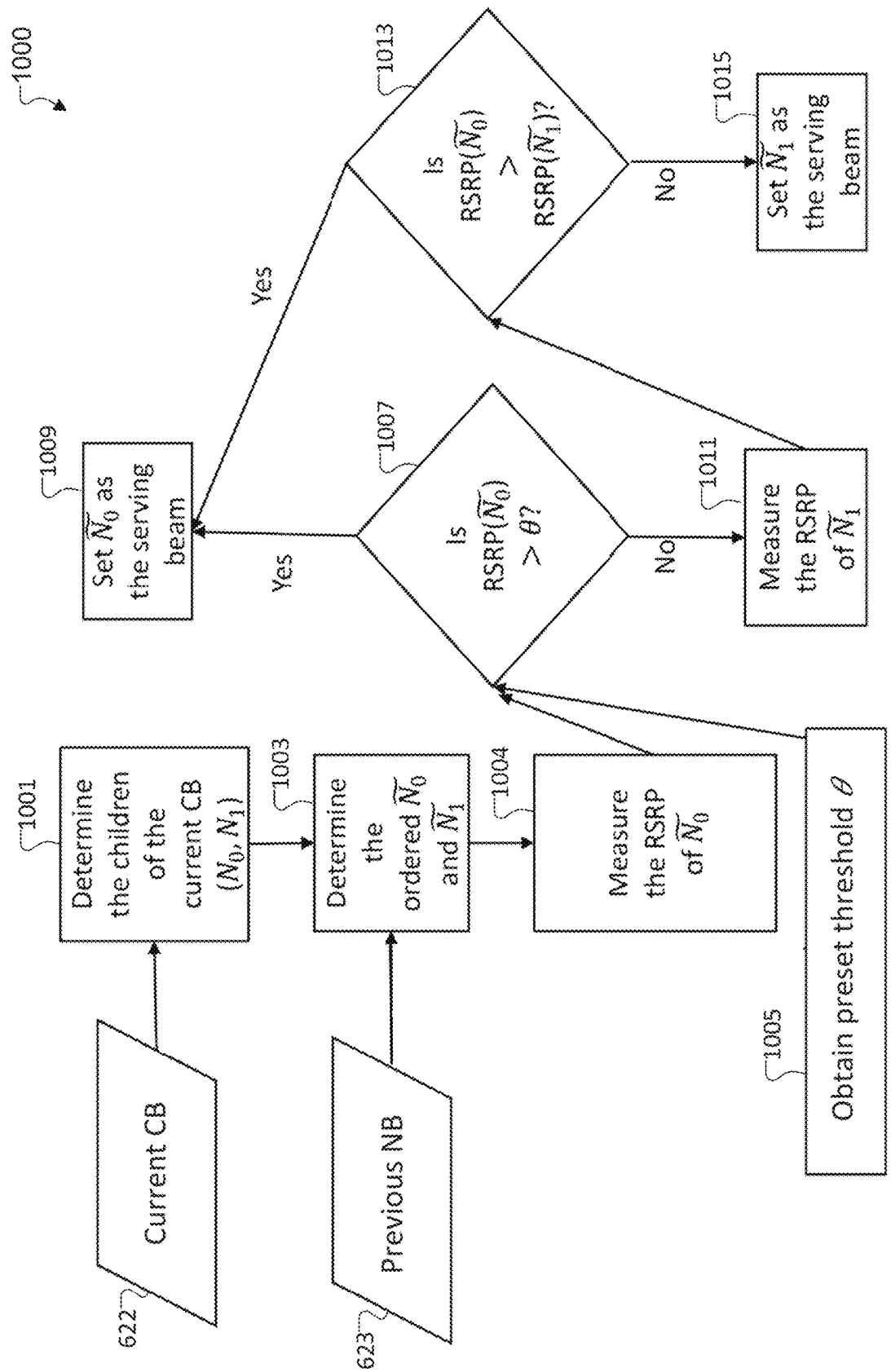

FIG. 10 illustrates yet another example process 1000 for composite beam operation and overhead reduction according to embodiments of the present disclosure. For ease of explanation, the process 1000 will be described as performed by the BS 102 of FIG. 1; however, the process 1000 could be performed by any other suitable device or system. The embodiment of the process 1000 shown in FIG. 10 is for illustration only. Other embodiments of the process 1000 could be used without departing from the scope of this disclosure.

Like the processes 800 and 900, the process 1000 can be useful in implementations where the BS 102 has limited information about the UE, such as its speed, serving distance, and the like. Hence, the process 1000 differs from the process 600 in that the process 1000 only relies on the BS CB codebook and the available RSRP measurements. The process 1000 also considers the case where pairing the NBs into CBs is done in a way such that all the CBs have roughly the same beam width. In this case, a fixed threshold θ could be sufficient, since the F function is identical for the different CBs.

As shown in FIG. 10, some of the operations of the process 1000 are the same as, or similar to, corresponding operations in the process 800. However, the procedure to determine the threshold θ is different in the process 1000 as compared to the process 800.

At operation 1001, the BS 102 determines the child NBs of the current CB 622. In this example, there are two child NBs, which are denoted as $N_0$ and $N_1$. At operation 1003, the BS 102 determines an order for the child NBs $N_0$ and $N_1$, and denotes the first beam as $\widetilde{N_1}$ and denotes the second beam as $\widetilde{N_0}$. The ordering of the child NBs in operation 1003 can be based on the distance between the NBs, such as in operation 603. At operation 1004, the BS 102 measures the RSRP of the first beam $\widetilde{N_1}$.

At operation 1005, rather than calculating the threshold θ, the BS 102 receives or obtains a predetermined threshold θ as an input. In some embodiments, the threshold θ could be (i) the previous RSRP of the serving NB in the previous time slot, (ii) the required RSRP to support UE data rate requirement, (iii) the average RSRP of the serving NB over a time interval (for example, the previous second or the previous minute), or any other suitable threshold value.

Once the BS 102 measures the RSRP of the first beam $\widetilde{N_1}$ at operation 1004 and obtains the threshold θ at operation 1005, then at operation 1007, the BS 102 determines if the RSRP of the first beam $\widetilde{N_1}$ is greater than the threshold θ. If the RSRP of the first beam $\widetilde{N_1}$ is greater than the threshold θ, then at operation 1009, the BS 102 sets the first beam $\widetilde{N_1}$ as the serving beam. Alternatively, if the RSRP of the first beam $\widetilde{N_1}$ is not greater than the threshold θ, then at operation 1011, the BS 102 measures the RSRP of the second beam $\widetilde{N_0}$. Then, at operation 1013, the BS 102 determines if the RSRP of the first beam $\widetilde{N_1}$ is greater than the RSRP of the second beam $\widetilde{N_0}$. If so, then at operation 1009, the BS 102 sets the first beam $\widetilde{N_1}$ as the serving beam. If not, then at operation 1015, the BS 102 sets the second beam $\widetilde{N_0}$ as the serving beam.

Although FIGS. 6 through 10 illustrate various processes and details related to composite beam operation and overhead reduction, various changes may be made to FIGS. 6 through 10. For example, various components in FIGS. 6 through 10 could be combined, further subdivided, or omitted and additional components could be added according to particular needs. In addition, various operations in FIGS. 6 through 10 could overlap, occur in parallel, occur in a different order, or occur any number of times.

Figure 11:
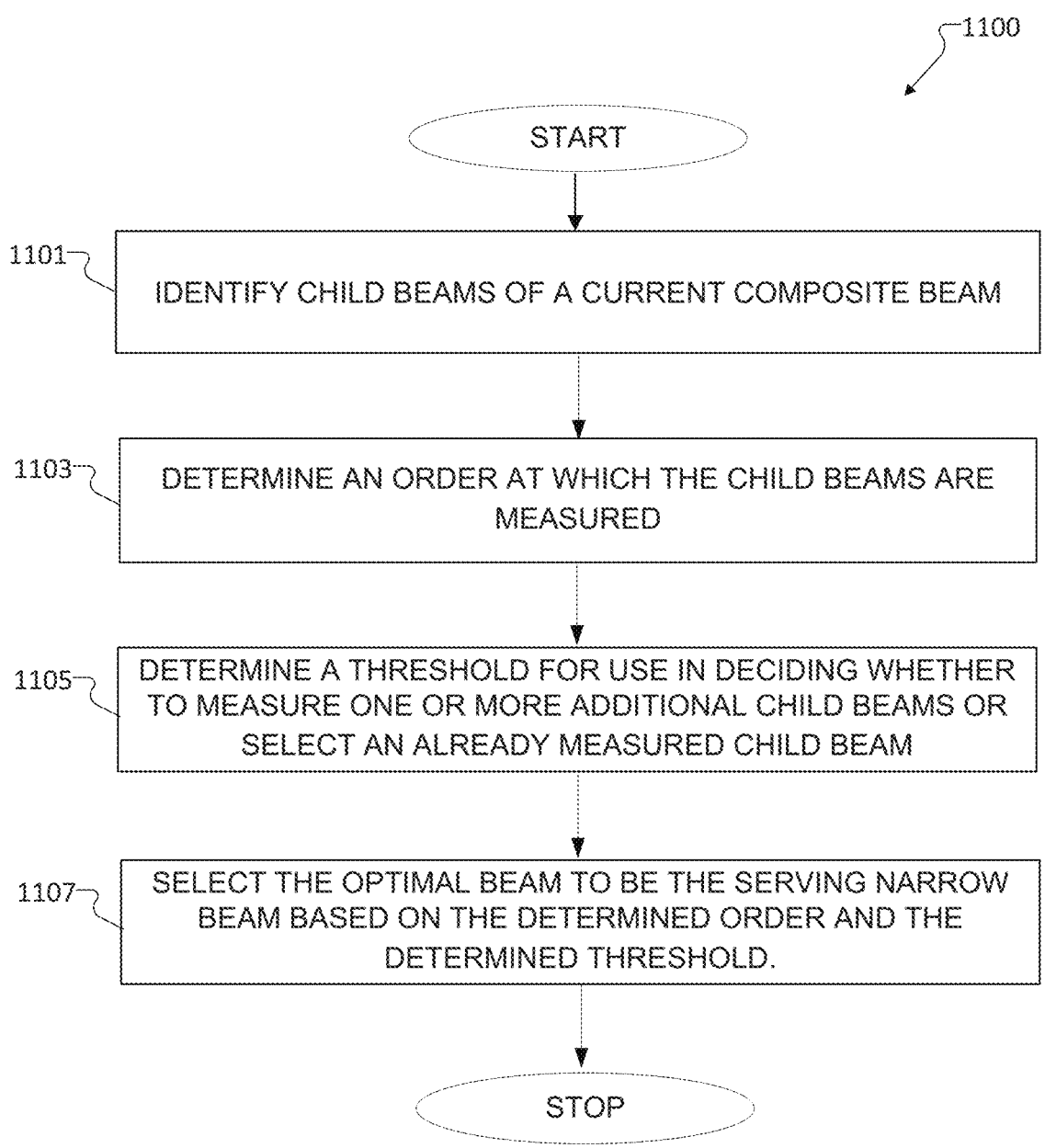
FIG. 11 illustrates a method for composite beam operation and overhead reduction according to embodiments of the present disclosure.

FIG. 11 illustrates a method 1100 for composite beam operation and overhead reduction according to embodiments of the present disclosure, as may be performed by one or more components of the network 100 (e.g., the BS 102). The embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1101. At step 1101, a BS identifies child beams of a current composite beam. This could include, for example, the BS 102 identifying the child beams $N_0$ and $N_1$ of a current composite beam, such as by performing operations 601, 801, 901, or 1001.

At step 1103, the BS determines an order at which the child beams of the current composite beam are measured based on a likelihood that each child beam of the current composite beam is an optimal beam, among the child beams, to be a serving narrow beam. This could include, for example, the BS 102 determining an order of the child beams $N_0$ and $N_1$ as a first beam $\widetilde{N_1}$ and a second beam $\widetilde{N_0}$, such as by performing operations 603, 803, 903, or 1003.

At step 1105, the BS determines a threshold for use in deciding whether to measure one or more additional child beams or select an already measured child beam when selecting the optimal beam. This could include, for example, the BS 102 determining or obtaining the threshold θ, such as by performing operations 605, 805, 905, or 1005.

At step 1107, the BS selects the optimal beam, among the child beams, to be the serving narrow beam based on the determined order and the determined threshold. This could include, for example, the BS 102 setting the first beam $\widetilde{N_1}$ or the second beam $\widetilde{N_0}$ as the serving beam, such as by performing some of the operations 607-615, 807-815, 907-915, or 1007-1015.

Although FIG. 11 illustrates one example of a method 1100 for composite beam operation and overhead reduction, various changes may be made to FIG. 11. For example, while shown as a series of steps, various steps in FIG. 11 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    identifying child beams of a current composite beam;
    determining an order at which the child beams of the current composite beam are measured based on a likelihood that each child beam of the current composite beam is an optimal beam, among the child beams, to be a serving narrow beam;
    determining a threshold for use in deciding whether to measure one or more additional child beams or select an already measured child beam when selecting the optimal beam; and
    selecting the optimal beam, among the child beams, to be the serving narrow beam based on the determined order and the determined threshold, wherein the threshold is determined based on a reference signal received power (RSRP) of each child beam and wherein the RSRP of each child beam is to support a required data rate of a user equipment (UE).

2. The method of claim 1, further comprising:
    computing the likelihood that each child beam is the optimal beam to be the serving narrow beam based on information associated with previously used narrow beams and composite beams.

3. The method of claim 2, wherein the likelihood that each child beam is the optimal beam is computed based on at least one of:
    a spatial distance between each of the child beams and a previously used narrow beam;
    an angular distance between each of the child beams and the previously used narrow beam; and
    a UE mobility pattern.

4. The method of claim 1, wherein the order at which the child beams are measured is an order from mostly likely to be the optimal beam to least likely to be the optimal beam.

5. The method of claim 1, wherein the threshold is determined based on at least one of:
    a speed of the UE;
    a beam width of the current composite beam;
    a serving distance between a base station (BS) and the UE;
    a line-of-sight (LOS)/non-line-of-sight (NLOS) state of the UE;
    a RSRP of the current composite beam; and
    a RSRP of a previously used narrow beam.

6. The method of claim 1, wherein the threshold is determined based on at least one of:
    a RSRP of a previous serving narrow beam in a previous time slot; and
    an average RSRP of the previous serving narrow beam over a previous time interval.

7. The method of claim 1, wherein selecting the optimal beam, among the child beams, to be the serving narrow beam comprises at least one of:
    ceasing measurement of the one or more additional child beams and selecting the already measured child beam to be the serving narrow beam when a RSRP of the already measured child beam is higher than the threshold; and
    selecting one of the one or more additional child beams to be the serving narrow beam when the RSRP of the already measured child beam is lower than the threshold and a RSRP of the selected one additional child beam is higher than the RSRP of the already measured child beam.

8. A device comprising:
    a transceiver; and
    a processor operably connected to the transceiver, the processor configured to:
        identify child beams of a current composite beam;
        determine an order at which the child beams of the current composite beam are measured based on a likelihood that each child beam of the current composite beam is an optimal beam, among the child beams, to be a serving narrow beam;
        determine a threshold for use in deciding whether to measure one or more additional child beams or select an already measured child beam when selecting the optimal beam; and
        select the optimal beam, among the child beams, to be the serving narrow beam based on the determined order and the determined threshold,
    wherein the threshold is determined based on a reference signal received power (RSRP) of each child beam, and
    wherein the RSRP of each child beam is to support a required data rate of a user equipment (UE).

9. The device of claim 8, wherein the processor is further configured to:
    compute the likelihood that each child beam is the optimal beam to be the serving narrow beam based on information associated with previously used narrow beams and composite beams.

10. The device of claim 9, wherein the likelihood that each child beam is the optimal beam is computed based on at least one of:
    a spatial distance between each of the child beams and a previously used narrow beam;
    an angular distance between each of the child beams and the previously used narrow beam; and
    a UE mobility pattern.

11. The device of claim 8, wherein the order at which the child beams are measured is an order from mostly likely to be the optimal beam to least likely to be the optimal beam.

12. The device of claim 8, wherein the processor is configured to determine the threshold based on at least one of:
    a speed of the UE;
    a beam width of the current composite beam;
    a serving distance between a base station (BS) and the UE;
    a line-of-sight (LOS)/non-line-of-sight (NLOS) state of the UE;
    a RSRP of the current composite beam; and
    a RSRP of a previously used narrow beam.

13. The device of claim 8, wherein the processor is configured to determine the threshold based on at least one of:

a RSRP of a previous serving narrow beam in a previous time slot;
and
an average RSRP of the previous serving narrow beam over a previous time interval.

14. The device of claim 8, wherein to select the optimal beam, among the child beams, to be the serving narrow beam, the processor is configured to at least one of:
cease measurement of the one or more additional child beams and select the already measured child beam to be the serving narrow beam when a RSRP of the already measured child beam is higher than the threshold; and
select one of the one or more additional child beams to be the serving narrow beam when the RSRP of the already measured child beam is lower than the threshold and a RSRP of the selected one additional child beam is higher than the RSRP of the already measured child beam.

15. A non-transitory computer readable medium comprising program code that, when executed by a processor of a device, causes the device to:
identify child beams of a current composite beam;
determine an order at which the child beams of the current composite beam are measured based on a likelihood that each child beam of the current composite beam is an optimal beam, among the child beams, to be a serving narrow beam;
determine a threshold for use in deciding whether to measure one or more additional child beams or select an already measured child beam when selecting the optimal beam; and
select the optimal beam, among the child beams, to be the serving narrow beam based on the determined order and the determined threshold,
wherein the threshold is determined based on a reference signal received power (RSRP) of each child beam, and
wherein the RSRP of each child beam is to support a required data rate of a user equipment (UE).

16. The non-transitory computer readable medium of claim 15, wherein the program code further causes the device to:
compute the likelihood that each child beam is the optimal beam to be the serving narrow beam based on information associated with previously used narrow beams and composite beams.

17. The non-transitory computer readable medium of claim 16, wherein the likelihood that each child beam is the optimal beam is computed based on at least one of:
a spatial distance between each of the child beams and a previously used narrow beam;
an angular distance between each of the child beams and the previously used narrow beam; and
a UE mobility pattern.

18. The non-transitory computer readable medium of claim 15, wherein the order at which the child beams are measured is an order from mostly likely to be the optimal beam to least likely to be the optimal beam.

19. The non-transitory computer readable medium of claim 15, wherein the program code causes the device to determine the threshold based on at least one of:
a speed of the UE;
a beam width of the current composite beam;
a serving distance between a base station (BS) and the UE;
a line-of-sight (LOS)/non-line-of-sight (NLOS) state of the UE;
a RSRP of the current composite beam; and
a RSRP of a previously used narrow beam.

20. The non-transitory computer readable medium of claim 15, wherein the program code causes the device to determine the threshold based on at least one of:
a RSRP of a previous serving narrow beam in a previous time slot;
and
an average RSRP of the previous serving narrow beam over a previous time interval.

* * * * *